Patented Aug. 20, 1940

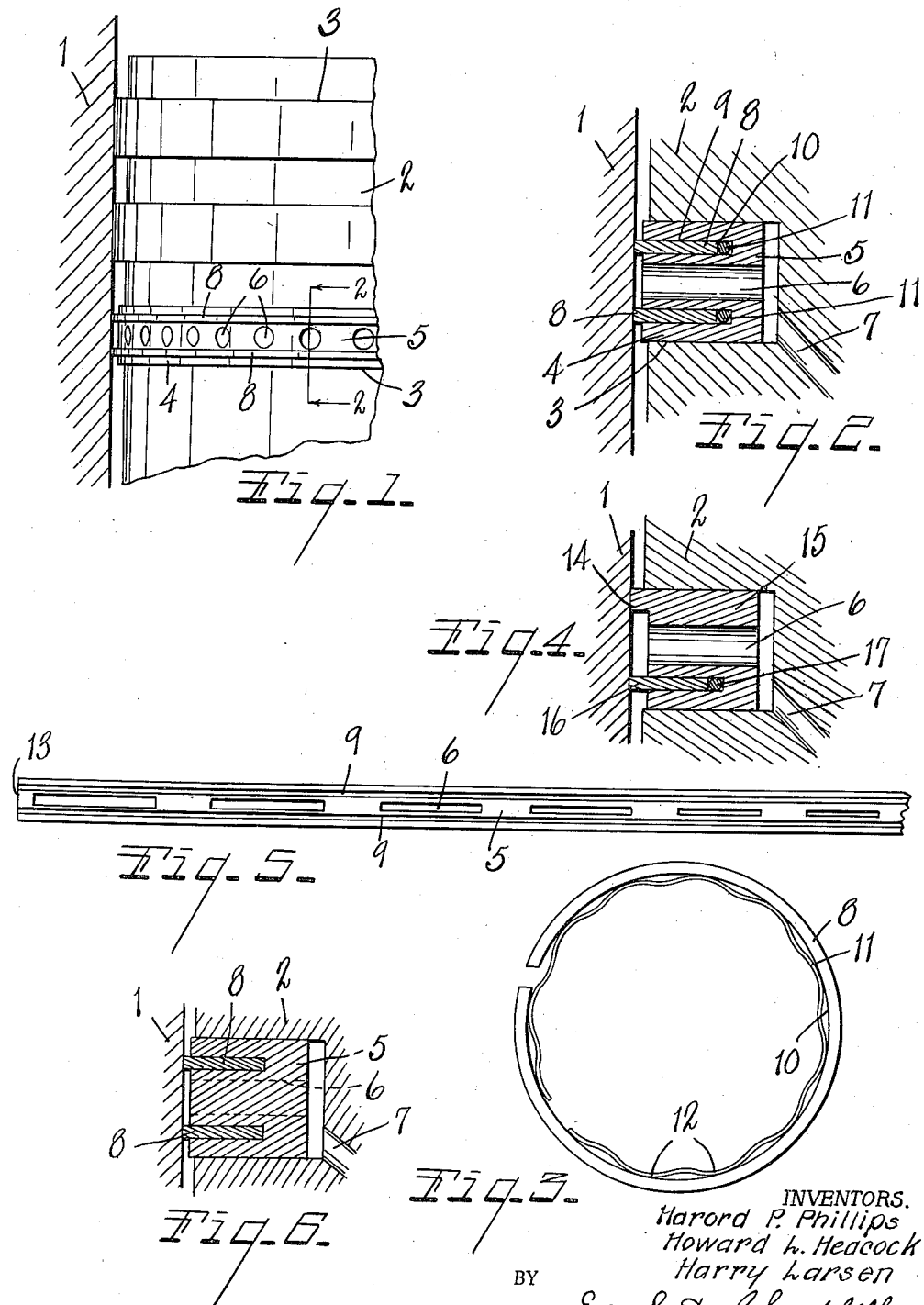

2,212,042

UNITED STATES PATENT OFFICE 2,212,042

PISTON RING ASSEMBLY

Harold P. Phillips, Howard L. Heacock, and Harry Larsen, Hastings, Mich., assignors to Hastings Manufacturing Company, Hastings, Mich.

Application October 29, 1938, Serial No. 237,688

14 Claims. (Cl. 309—45)

This invention relates to improvements in piston ring assemblies.

The main objects of our invention are:

First, to provide a novel composite piston ring or piston ring assembly for an internal combustion engine capable of producing high unit tension on a cylinder wall.

Second, to provide a composite ring of the type described characterized by its resistance to wear by its being unlikely to break in handling or use.

Third, to provide an assembly of the type described which is easily inserted in a piston ring groove for use.

Fourth, to provide an assembly of the type described comprising a plurality of cylinder wall engaging elements of relatively hard material and a body or carrier element therefor adapted for a working fit in the usual piston ring groove.

Fifth, to provide an element of the character described, wherein the carrier element has oil drainage openings and provisions for increasing its strength.

Sixth, to provide a composite piston ring which is characterized by its economy of production, by its effectiveness in operation to engage a cylinder wall uniformly throughout its periphery, and by the ease with which it is installed.

Further objects relating to details and economies of our invention will definitely appear from the description to follow. The invention is defined in the claims.

A structure embodying the features of our invention is illustrated in the accompanying drawing, wherein:

Fig. 1 is a fragmentary view in elevation illustrating a cylinder and piston with the latter provided with an oil ring embodying our invention.

Fig. 2 is an enlarged fragmentary view in section on line 2—2 of Fig. 1.

Fig. 3 is a plan view illustrating the relation of one of the cylinder wall contacting elements to an individual expanding member therefor.

Fig. 4 is a view similar to Fig. 2, illustrating a modified embodiment of our invention.

Fig. 5 is a fragmentary side view illustrating a portion of the body element of our assembly in developed or flat form.

Fig. 6 is a view similar to Fig. 2, showing a modified form or embodiment of our invention in which the individual expanders for the cylinder engaging elements are omitted.

The present invention relates generally to a composite piston ring of the type illustrated and described in the copending application of Harold P. Phillips, Serial No. 74,654, filed April 16, 1936, consisting of a plurality of cylinder wall engaging elements of thin ribbon steel, a spacer therefor, and provisions for urging the assembly into engagement with a cylinder wall. The present invention concerns more particularly an assembly of that type wherein there is provided an element adapted to both space a pair of cylinder contacting elements of relatively hard material and carry the same for reciprocating movement in the cylinder, as well as to impart and permit individual radial expansion and contraction in accordance with irregularities in the cylinder wall surface. The advantages of such a construction reside in the increased simplicity of installing the same on a piston, likewise in the elimination of an inner expanding spring or ring member, which has been found to have a tendency to move relative to the piston in operation, thus causing objectionable wear at certain portions thereof. The present invention, furthermore, in certain of its aspects, involves an oil ring having a plurality of oil drainage openings therein of such a type as to increase the strength of the ring as compared to conventional oil rings and thereby further the object of attaining high unit cylinder wall tension.

Referring to the drawing, the reference numeral 1 indicates in general a cylinder having a piston 2 reciprocable therein, the latter being provided with a plurality of annular grooves 3 adapted to receive compression rings and the composite oil ring assembly of our invention, which latter is designated by the reference numeral 4. Referring to Fig. 2, this assembly consists of a cast iron body and spacer element 5 whose dimensions are substantially the same as the dimensions of the groove 3, but which is of insufficient radial thickness to contact the cylinder wall. This element has a plurality of radial oil drainage openings 6 therein in communication with drain passages 7 leading from the groove 3 to the interior of the piston.

The assembly of our invention is characterized by a pair of split expansible cylinder wall engaging elements 8 of thin ribbon steel disposed in edge engaging relation to the cylinder wall and carried in narrow annular grooves 9 which are formed in the cast iron body member 5. The inner edge 10 of the elements 8 is engaged by an expanding spring or ring member 11 which may be of a suitable gauge of round or rectangular section spring wire stock, split for insertion and provided with a plurality of crimps or corrugations 12, see Fig. 3, adapted to engage the inner edge 10 and the bottom of the grooves 9 so as to urge the cylinder wall engaging elements radially outwardly for effective sliding and sealing engagement with the cylinder wall. The provision of such inner expanding members effects a substantial degree of independence in action of the steel elements 8, with the result that the entire periphery of the cylinder wall is engaged by one or both of the elements 8 regardless of irregularities or waves therein.

Although the aforesaid inner expanding rings or springs have certain advantages, among them the features pointed out above, however the omission thereof and the designing of the steel elements 8 and grooves 9 in such manner as to cause thrust engagement of the former with the bottom of the latter, are within the purview of our invention.

In actual practice, the cast iron carrier element or ring 5 is designed conventionally, to the extent that it has the correct amount of tension, free gap opening, and other qualities necessary for a good piston ring. Its radial thickness in the preferred construction is approximately .020 inch less than the radial thickness of a conventional one-piece cast iron ring, which dimension may vary as good practice dictates. The outer face of the carrier ring 5 need not have an accurate or high finish, since it does not contact the cylinder wall. As for the radial thickness of the steel elements 8, it is approximately .020 inch greater than the depth of the groove, so that the steel projects approximately .020 inch beyond the outer circumference of the carrier, however this dimension likewise may vary as circumstances dictate. The basic requirement is that the cast iron carrier and spacer ring or element 5 exert the necessary tension required to force the steel elements 8 into contact with the cylinder wall uniformly, so that uniform pressure is exerted all the way around the steel contacting area of the elements.

In order to further the object of uniformity of pressure, we contemplate that the oil drainage openings 6 shall be of graduated size from a maximum adjacent the split or gap 13 to a minimum approximately 180° from the gap and, further, if necessary, that one or more of the said openings be omitted adjacent the last named point, which is the point at which the maximum leverage is exerted on the carrier ring in action. Thus, in Fig. 5, we illustrate the variation in size of the drainage openings as being produced by graduation in the length and height thereof. The graduation of the size of the openings may be accomplished by other provisions, as more particularly described in the copending application of Phillips et al., Serial No. 258,359, filed Feb. 25, 1939, to which reference may be had.

By the foregoing construction, it is possible to stagger the joints of the various split elements of our assembly so that there is no possibility of "blow-by" or of oil passing the rings at an open joint. In Fig. 4, we illustrate a modified embodiment of our invention, wherein a narrow integral annular rib-like cylinder engaging portion 14 formed in the upper edge of the cast iron carrier or body element 5 performs the function of one of the steel sealing or wall engaging elements 8. Such an assembly may be used with or without an inner expanding spring (not shown) between the cast iron element 15 thereof and the bottom of the ring groove (as, of course, may the construction of Figs. 1–3 if the increased thrust is desired or necessary). The other wall engaging element 16 is similar in construction to the corresponding element in Figs. 1 and 2 and has an inner expanding spring member 17 urging the same outwardly. A composite ring of this type is somewhat less expensive than the type of Figs. 1 and 2 and, in addition, the cast iron cylinder wall engaging shoulder 14, by wearing in more quickly than a steel element, improves the operation of the assembly somewhat during the earlier stages of its operation. In the embodiment of Fig. 6, the expanders for the elements 8 are omitted.

The advantages of employing one or more thin cylinder wall contacting elements of ribbon steel are that they may be made extremely narrow so as to produce a high unit pressure without sacrifice of wearing quality; for example, a steel contacting section whose width is from .024 to .010 inch can be made to operate satisfactorily and to have more than twice the hardness of a cast iron contacting section .030 inch in width. Cast iron cylinder wall contacting sections narrower than the last named dimension are unpractical because of the danger of crumbling and rapid wear thereof and their susceptibility to breakage. A composite ring of the type described obtains the high unit wall tension which is primarily important in an oil ring without an accompanying total cylinder wall drag, at the same time resisting wear satisfactorily. This high unit tension is contributed to in part by the cast iron carrier 5 itself (which exerts a uniform peripheral expansive action by reason of the graduated size of the drainage openings therein) and also in part by the auxiliary inner expanding elements 11 in the grooves 9, which furthermore contribute an independence of action to the respective elements 8 found to be valuable in a composite ring of the type under consideration.

We have illustrated and described our improvements in embodiments which are very practical. We have not attempted to illustrate or describe other embodiments or adaptations as it is believed this disclosure will enable those skilled in the art to embody or adapt our improvements as may be desired.

Having thus described our invention, what we claim as new and desire to secure by Letters Patent is:

1. A composite piston ring for an internal combustion engine, comprising an annular split carrier element of rectangular cross section adapted to be received within a piston groove for expansible action therein, said carrier element having a plurality of oil drainage openings therethrough and being provided with a pair of narrow annular peripheral grooves disposed one on either side of said openings, and a thin cylinder wall engaging element formed of ribbon steel in each of said grooves projecting radially beyond the face of the carrier element for cylinder wall engagement, said carrier element being out of contact with the cylinder wall, said cylinder wall engaging elements being subject to the expansive action of said carrier element.

2. A composite piston ring for an internal combustion engine, comprising an annular expansible carrier element provided with at least one narrow peripheral annular groove, and a thin wall engaging element of wear resistant material disposed in said groove and projecting radially substantially beyond the face of the carrier element for engagement with the cylinder wall, said carrier element being substantially spaced from and out of engagement with the cylinder wall adjacent said groove.

3. A composite piston ring assembly comprising a split expansible cast iron body member adapted to be received in a piston ring groove for expansible action therein, said body member having a pair of narrow spaced peripheral grooves spaced from but adjacent to the sides of the body member, and a thin cylinder wall engaging element formed of ribbon steel disposed in each of said grooves for expansible action therein and projecting radially outwardly beyond the face of the body member for engagement with the cylinder wall, said body member being out of engagement with the cylinder wall in operation.

4. A composite piston ring assembly comprising a split expansible body member adapted to be received in a piston ring groove for expansible action therein, said body member having a pair of narrow spaced peripheral grooves spaced from but adjacent to the sides of the body member, and a thin cylinder wall engaging element of relatively hard material disposed in each of said grooves for expansible action therein and projecting radially outwardly beyond the face of the body member for engagement with the cylinder wall, said body member being out of engagement with the cylinder wall in operation.

5. A piston ring assembly comprising an expansible body member of rectangular cross section adapted to be expansibly received in a piston ring groove and having at least one narrow peripheral annular groove therein spaced from the sides of the body member, and a thin steel cylinder wall engaging element disposed in said groove and projecting radially beyond the face of the body element for engagement with a cylinder wall, said body member being spaced from the cylinder wall adjacent the groove.

6. A composite piston ring comprising a split expansible body member of rectangular section adapted for expansive action within a piston ring groove and having at least one peripheral integral annular relatively narrow cylinder wall engaging portion and at least one peripherally opening narrow annular groove spaced from the said cylinder wall engaging portion, said body member being provided with a plurality of oil drainage openings between said cylinder wall engaging portion and said groove, a thin annular cylinder wall engaging element of ribbon steel and rectangular in cross section disposed in said groove, and an expander for said ribbon steel wall engaging element disposed in said groove.

7. A composite piston ring comprising a split expansible body member of rectangular section adapted for expansive action within a piston ring groove and having at least one peripheral integral annular relatively narrow cylinder wall engaging portion and at least one peripherally opening narrow annular groove spaced from the said cylinder wall engaging portion, said member being spaced from the cylinder wall adjacent said last named groove, a thin annular cylinder wall engaging element of ribbon steel disposed in said groove in the body member, and an expander for said ribbon steel wall engaging element disposed in said body member groove.

8. A composite piston ring comprising a split expansible cast iron body member of rectangular cross section adapted for expansive action within a piston ring groove and having at least one peripheral integral annular relatively narrow cylinder wall engaging portion and at least one peripherally opening narrow annular groove spaced from the said cylinder wall engaging portion, said body member being provided with a plurality of oil drainage openings between said cylinder wall engaging portion and said groove, and a thin annular cylinder wall engaging element of ribbon steel and rectangular in cross section disposed in said groove.

9. A composite piston ring comprising a split expansible body member of rectangular cross section adapted for expansive action within a piston ring groove and having at least one peripheral integral annular relatively narrow cylinder wall engaging portion and at least one peripherally opening narrow annular groove spaced from the said cylinder wall engaging portion, and a thin annular cylinder wall engaging element disposed in said groove.

10. A composite piston ring comprising a split expansible member adapted for expansive action within a piston ring groove and having at least one peripheral integral annular relatively narrow cylinder wall engaging portion and at least one peripherally opening narrow annular groove spaced from the said cylinder wall engaging portion, said member being provided with a plurality of oil drainage openings between said cylinder wall engaging portion and said groove, and a thin annular cylinder wall engaging element disposed in said groove, said drainage openings being graduated in size from the maximum adjacent the split in said member to a minimum approximately 180° from said split whereby to render substantially uniform the radial expansive effort exerted by the member.

11. A piston ring assembly comprising a split body member having an annular groove, said body member having a plurality of circumferentially spaced oil drainage openings, and a thin cylinder wall engaging element disposed in said groove for engagement with a cylinder wall and in radial thrust relation to the said body member, said body member urging said wall engaging element outwardly, said drainage openings being of graduated size from a maximum adjacent the split thereof to a minimum approximately 180° from the split to render uniform the expansible effort exerted on the cylinder wall engaging element by the body member.

12. A piston ring assembly comprising a split cast iron body member having spaced parallel annular grooves in spaced relation to the sides thereof, said body member having a plurality of circumferentially spaced oil drainage openings, and a thin cylinder wall engaging element of ribbon steel disposed in each of said grooves for engagement with a cylinder wall and in radial thrust relation to the said body member, said body member urging said wall engaging elements outwardly and being substantially spaced from and out of engagement with the cylinder wall adjacent said grooves.

13. A quick seating oil ring for the pistons of internal combustion engines, comprising a split cast iron ring generally corresponding in cross section to that of the piston ring groove, elongated radial oil ports circumferentially spaced in said ring, said ports being located in the same transverse plane with a major portion of said ring in said plane being of port defining structure, a narrow groove in an unported area of said ring, said groove being located to one side of said ports in a parallel transverse plane, a resilient split steel insert ring disposed in said narrow groove, said insert ring being of greater radial dimensions than said groove so as to project beyond the face of said cast iron ring.

14. A quick seating oil ring for the pistons of internal combustion engines, comprising a split cast iron ring generally corresponding in cross-section to that of the piston ring groove, elongated radial oil ports circumferentially spaced in said ring, said ports being all located in the same central transverse plane with a major portion of said ring in said plane being of port defining structure, a pair of narrow grooves located in unported areas of said ring above and below said central plane, a pair of narrow resilient split spring steel insert rings located in said grooves, said insert rings being of greater radial dimensions than said grooves so as to project beyond the face of said cast iron ring.

HAROLD P. PHILLIPS.
HOWARD L. HEACOCK.
HARRY LARSEN.